United States Patent [19]

Yoshida et al.

[11] Patent Number: 4,743,670

[45] Date of Patent: May 10, 1988

[54] METHOD FOR PRODUCING SILICONE RUBBER POWDER

[75] Inventors: Keiji Yoshida; Koji Shimizu, both of Ichihara; Mitsuo Hamada, Kisarazu, all of Japan

[73] Assignee: Toray Silicone Co., Ltd., Tokyo, Japan

[21] Appl. No.: 95,794

[22] Filed: Sep. 14, 1987

[30] Foreign Application Priority Data

Sep. 22, 1986 [JP] Japan ................................ 61-224500

[51] Int. Cl.$^4$ ............................................. C08G 77/06
[52] U.S. Cl. ...................................... 528/15; 525/478; 528/24; 528/31; 528/32
[58] Field of Search ........................ 528/15, 31, 32, 24; 525/478

[56] References Cited

U.S. PATENT DOCUMENTS 4,594,134  6/1986  Hanada et al. ........................ 528/15

Primary Examiner—Melvyn I. Marquis
Attorney, Agent, or Firm—Robert Spector

[57] ABSTRACT

Cured silicone rubber in the form of a finely divided powder is prepared by (1) dispersing a heat-curable liquid silicone rubber composition in water maintained at a temperature of from 0° to 25° C., (2) dispersing the resultant dispersion in a liquid heated to a temperature of at least 50° C., and (3) recovering the resultant cured powder. The liquid silicone rubber composition is preferably maintained at a temperature of from −60° to 0° C. before being emulsified and said liquid is preferably water.

5 Claims, No Drawings

METHOD FOR PRODUCING SILICONE RUBBER POWDER

BACKGROUND OF THE INVENTION

1. Field of the Invention

The present invention relates to a method for producing silicone rubber powder. More particularly, this invention relates to a method for producing silicone rubber in the form of a powder that is suitable for use as an electrical insulating material and is prepared from a heat-curable liquid organosiloxane composition.

2. Description of the Prior Art

Methods known in the art for producing silicone rubber powder include pulverizing cured silicone rubber into a powder after it has been frozen with dry ice, and pulverizing cured silicone rubber into a powder using a grinder at ambient temperature. The primary disadvantage of these methods is the difficulty of obtaining microfine particles of uniform shape at a high production rate.

Copending U.S. patent application Ser. No. 034,368, filed on Apr. 6, 1987 in the names of two of the present three inventors teaches a method for forming a powdered form of silicone rubber. In accordance with this method a liquid heat curable silicone rubber composition is emulsified in water in the presence of a surfactant at a temperature of from 0° to 25° C. The emulsion is then sprayed into a water bath maintained at a temperature of at least 25° C. and sufficiently high to cure the ingredients of the silicone rubber composition. The disadvantage of this method is that the specific resistivity of the resultant particles is in the order of from $10^{12}$ to $10^{13}$ ohm-centimeter, which is typically too low for an electrical insulating material.

The present inventors endeavored to find a method for preparing a powder form of silicone which would not suffer from the aforementioned problems. The present invention was developed as a result of these investigations.

SUMMARY OF THE INVENTION

One objective of the present invention is to provide a highly productive method for producing a microfine silicone rubber powder of uniform particle shape and size. A second objective is to provide a powdered silicone rubber exhibiting a level of volume resistivity characteristic of an electrical insulator.

The aforesaid objectives are achieved by forming a dispersion of a liquid heat-curable silicone rubber composition in water that is maintained at a temperature below 25° C. and subsequently curing the composition by dispersing said dispersion into a liquid maintained at a temperature of at least 50° C.

DETAILED DESCRIPTION OF THE INVENTION

This invention provides a method for preparing a finely divided cured silicone rubber powder exhibiting a volume resistivity greater than $10^{13}$ ohm-cm, said method comprising the sequential steps of (1) Forming a dispersion of a heat-curable liquid silicone rubber composition in water maintained at temperature of from 0° to 25° C. and in the absence of surfactants, and (2) dispersing the resultant dispersion into a liquid maintained at a temperature of at least 50° C. to cure the liquid silicone rubber composition into a powder, and (3) isolating the cured powder.

The feature that distinguishes the present method from that disclosed in the aforementioned copending U.S. patent application Ser. No. 034,368 is the absence of a surfactant in the water into which the heat-curable silicone rubber composition is dispersed. By omitting the surfactant from the dispersed curable composition it is possible to prepare a cured silicone rubber powder suitable for use as an electrical insulator.

The heat-curable liquid silicone rubber composition used in the present invention is a liquid or a paste at ambient temperature and comprises a liquid, reactive group-containing organopolysiloxane, a crosslinker for the organopolysiloxane and/or a curing catalyst. Typically silicone rubber compositions of this type cure into a rubbery elastomer upon standing under ambient conditions or by heating. Both self supporting and non-self supporting types of curable liquid compositions can be used to form powdered silicone rubber in accordance with the present method.

With regard to the curing mechanism of the compositions. the present method can utilize addition-reaction types, organoperoxide-based radical reaction-curing types and condensation-reaction types. Addition-reaction types are preferred due to their rapid curing rate and excellent uniformity in curing.

Particularly preferred addition-reaction type liquid silicone rubber compositions are those comprising (A) an organopolysiloxane having at least 2 lower alkenyl radicals in each molecule. (B) an organopolysiloxane having at least 2 silicon-bonded hydrogen atoms in each molecule, (C) as the curing catalyst a platinum-group metal or a compound of said metal at a concentration equivalent to from 0.1 to 1.000 parts by weight of a platinum-group metal per million parts by weight of combined components (A) and (B). hereinafter designated as ppm.

A requirement for these preferred types of curable compositions is that the sum of the number of alkenyl radicals in each molecule of component (A) and the number of hydrogen atoms in each molecule of component (B) be at least 5.

Component (A) is the principal component of the preferred class of curable liquid silicone rubber compositions used in accordance with the present method, and it reacts with component (B) in the presence of a platinum group metal or compound thereof, component (C), to produce a cured silicone rubber. Component (A) must contain at least 2 lower alkenyl radicals bonded to silicon in each molecule. When less than 2 of these lower alkenyl radicals are present, a network structure cannot be formed, and a good cured product cannot be obtained.

The lower alkenyl radicals present in component (A) are exemplified by vinyl, allyl, and propenyl. The lower alkenyl radicals can be present at any position in the molecule, but they are preferably present at least at the molecular terminals. Furthermore. the molecular configuration of component (A) can be straight chain, branch-containing straight chain, cyclic, or network, but a straight chain configuration, possibly slightly branched, is preferred. The molecular weight of this component is not specifically restricted. While the viscosity may range from that of a low-viscosity liquid to a very high-viscosity gum, the viscosity at 25° C. is preferably at least 100 cP (0.1 Pa.s) in order to obtain a rubbery elastomeric cured material.

Suitable vinyl-containing organopolysiloxanes include but are not limited to methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3.3-trifluoropropyl)polysiloxanes, dimethylvinylsiloxy-terminated dimethylsiloxane-methyl(3.3.3-trifluoropropyl)siloxane copolymers, and polysiloxanes composed of $CH_2=CH(CH_3)_2SiO_{\frac{1}{2}}$, $(CH_3)_3SiO_{\frac{1}{2}}$ and $SiO_{4/2}$ units. Combination of two or more of the aforesaid organopolysiloxanes can be used in the present invention.

Component (B) of the preferred curable compositions is the crosslinker for component (A). Curing proceeds by the addition reaction of the silicon-bonded hydrogen atoms in this component with the lower alkenyl radicals in component (A) under the catalytic activity of component (C). Component (B) must contain at least 2 silicon-bonded hydrogen atoms in each molecule in order to function as a crosslinker.

The sum of the number of alkenyl radicals in each molecule of component (A) plus the number of silicon-bonded hydrogen atoms in each molecule of component (B) must be at least 5. It is undesirable for this sum to be less than 5 because a network structure essentially cannot then be formed. and an excellent cured article cannot be obtained.

The molecular configuration of component (B) is not specifically restricted, and it can be straight chain, branch-containing straight chain, or cyclic. While the molecular weight of this component is similarly not specifically restricted, the viscosity at 25° C. is preferably from 1 to 50.000 cP (0.001 to 50 Pa.s) in order to obtain a good miscibility with component (A).

The quantity of addition of component (B) is preferably defined by the condition that the molar ratio of the total number of silicon-bonded hydrogen atoms in this component to the total quantity of all lower alkenyl radicals in component (A) is from 0.5:1 to 20:1. When this molar ratio is less than 0.5:1, a well cured composition will not be obtained. When this molar ratio exceeds about 20:1, there is a tendency for the hardness of the cured composition to increase when heated. Furthermore. if additional resinous organosiloxanes having large concentrations of alkenyl radicals are added to the present compositions for the purpose of reinforcement or other reason. it is preferred that a supplementary amount of component (B) be added to react with these additional alkenyl radicals.

Examples of this component (B) include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{\frac{1}{2}}$ units and $SiO_{4/2}$ units, and copolymers composed of $(CH_3)_3SiO_{178}$ units, $(CH_3)_2HSiO_{\frac{1}{2}}$ units and $SiO_{4/2}$ units.

Component (C) is a catalyst for the addition reaction of silicon-bonded hydrogen atoms with alkenyl radicals. Suitable catalysts include metals from the platinum group of the periodic table of the elements and compound of these metals. Concrete examples of catalysts include but are not limited to chloroplatinic acid, chloroplatinic acid dissolved in an alcohol or ketone as well as such solutions which have been ripened, chloroplatinic acid-olefin complexes, chloroplatinic acid-alkenylsiloxane complexes, chloroplatinic acid-diketone complexes, platinum black and platinum supported on a carrier.

The concentration of component (C) in the present curable compositions is typically equivalent to from 0.1 to 1,000 ppm of platinum-group metal, based on the total weight of components (A) and (B). Crosslinking will not proceed satisfactorily at below 0.1 ppm of component (C), while exceeding 1,000 weight ppm is uneconomical. Typically a concentration of from 1 to 100 ppm is preferred.

A filler can be present in the present curable liquid silicone rubber compositions to adjust the viscosity or improve the mechanical strength of the final cured article. Suitable fillers are exemplified by reinforcing fillers such as precipitated silica, fumed silica, calcined silica and fumed titanium dioxide, and by non-reinforcing fillers such as quartz powder, diatomaceous earth, asbestos, aluminosilicic acid, iron oxide, zinc oxide and calcium carbonate. These fillers may be used without prior treatment or can be treated with an organosilicon compound such as hexamethyldisilazane, trimethylchlorosilane or a hydroxyl terminated dimethylpolysiloxane before being combined with the other ingredients of the heat-curable liquid silicone rubber composition.

In addition to a filler, the present class of liquid compositions that cure by a platinum catalyzed addition reaction can contain other optional ingredients including but not limited to pigments, heat stabilizers, flame retardants, plasticizers and organopolysiloxanes having 1 alkenyl radical per molecule, the latter being for the purpose of reducing the modulus of the final cured article.

A small or very small amount of a curing reaction-retarding additive such as an acetylenic compound, a hydrazine, a triazole, a phosphine or a mercaptan can be added to the present curable compositions unless this adversely affects the objective of the invention.

A second preferred type of curable liquid silicone rubber composition cures by a free radical mechanism initiated by decomposition of an organoperoxide. These compositions comprise a vinyl-containing diorganopolysiloxane which is liquid at room temperature, and a catalytic quantity of an organoperoxide. Inorganic fillers, for example, fumed silica or precipitated silica, heat stabilizers, and pigments can be added as necessary. The decomposition temperature of the organoperoxide is preferably within the range of from 25° to 100° C.

The ingredients of the heat curable liquid silicone rubber composition are combined and blended at temperatures of from −60° to +5° C. and preferably within the range of from −30° to 0° C. This is because the organopolysiloxanes used in the present invention tend to gel at temperatures below −60° C., and so cannot be discharged. The compositions cure during mixing at temperatures above +5° C. In either instance it may not be possible to produce a uniform dispersion in an aqueous medium as required by the present method.

In accordance with this method, a heat-curable liquid silicone rubber composition produced using any of the methods described herein is dispersed by gradually adding it to water with rapid stirring or under high shear such as that produced by a mechanical homogenizer. The temperature of the water is maintained within the range of from 0° to 25° C. until it is desired to cure the composition is cured as described hereinbelow.

The dispersion of the curable silicone rubber composition in water can be prepared by a number of methods. In accordance with one of these methods, water is added to the liquid silicone rubber composition, and this is passed through a colloid mill or commercial homogenizer to form the dispersion. In another method, the ingredients of the curable liquid silicone rubber composition are placed in a homomixer, the surfactant is added and mixed, and water is then added followed by stirring.

The dispersion is prepared at temperatures within the range of from 0° to 25° C. It will be understood that the water will freeze at below 0° C. thus preventing the formation of a suitable dispersion. Curing of the liquid silicone rubber typically occurs at temperatures above 25° C., with the result that the shape of the particles of cured silicone rubber powder will tend to be quite irregular.

The aqueous dispersion of a heat-curable liquid silicone rubber composition produced as described above is cured by dispersing it a liquid maintained at a temperature of at least 50° C. Temperatures below 50° C. are undesirable because the curing rate of the liquid silicone rubber compositions used in the present invention may be sufficiently slow as to result in irregularly shaped particles of cured rubber and a reduced production rate.

There are no specific restrictions on the liquid into which the aqueous dispersion of a curable silicone rubber composition produced in accordance with the first step of the present method is, in turn, dispersed to cure the composition and produce the cured silicone rubber powder of the present invention. Specific examples of suitable liquids include but are not limited to water, liquid paraffins, waxes, and the various liquid compounds used as thermally conductive materials, for example, dimethylpolysiloxane oils and phthalate esters.

Numerous methods can be used to disperse the aqueous dispersion of liquid silicone rubber composition into the liquid medium used to cure the composition. In accordance with one of these methods, the initial aqueous dispersion is itself dispersed into the heated liquid curing medium by continuously supplying the dispersion in small portions to a stirrer-equipped mixer filled with the heated curing medium that is maintained at a temperature of at least 50° C.

The quantity of liquid curing medium is preferably at least twice the total quantity of initial aqueous dispersion. When less than this amount of curing medium is used there is a tendency for the shape of the produced silicone rubber powder to be irregular.

The following examples describe preferred embodiments of the present method and should not be interpreted as limiting the scope of the invention defined in the accompanying claims. All parts and percentages in the examples are by weight, and viscosities were measured at 25° C.

EXAMPLE 1

Six parts of a trimethylsiloxy-terminated methylhydrogenpolysiloxane having a viscosity of 10 centipoise (0.01 Pa.s) and a silicon-bonded hydrogen content of 1.0 wt % were added and mixed into 100 parts of a dimethylvinylsiloxy-terminated dimethylpolysiloxane having a viscosity of 1,000 centipoise (1 Pa.s) and a vinyl content of 0.5 wt % to yield a mixture identified hereinafter as mixture A. 0.3 Parts of an isopropanol solution of chloroplatinic acid (platinum content=3 wt %) was added and mixed into 100 parts of a dimethylpolysiloxane of the type described in this example to yield a second mixture identified hereinafter as mixture B. Mixtures A and B were placed in separate liquid silicone rubber composition tanks. The mixtures were blended at a 1:1 weight ratio to yield a mixture C by feeding them through pressure-delivery pumps into a mixer equipped with a stirrer. The interior of the mixer had been cooled in advance to −10° C. 500 parts of mixture C and 1,000 parts of water cooled to a temperature of 5° C. were delivered by means of pressurized delivery pumps into a colloid mill manufactured by Manton-Gaulin. The interior of the colloid mill had been cooled in advance to a temperature of +5° C. the mill was operated at a speed of 1,400 rpm using a 0.1 mm gap to yield an aqueous dispersion of a liquid heat-curable silicone rubber composition of this invention. The temperature of the resultant dispersion was +5° C. This dispersion was then immediately fed in a continuous manner into a stirrer-equipped mixer filled with water heated at a temperature of 80° C., and the stirrer was operated at a speed of 10 rpm. The resultant was spherical particles of cured silicone rubber had an average particle size of 10 microns. The volume resistivity of this cured silicone rubber powder was $10^{15}$ ohm-cm.

EXAMPLE 2

Three parts of a trimethylsiloxy-terminated methylhydrogenpolysiloxane having a viscosity of 10 centipoise (0.01 Pa.s) and a silicon-bonded hydrogen content of 1 wt % were added and mixed into 100 parts dimethylvinylsiloxy-terminated dimethylpolysiloxane having a viscosity of 2.000 centipoise and a vinyl content of 0.25 wt % to yield a first mixture. 0.3 Part of an isopropanol solution of chloroplatinic acid having a platinum content of 3% was added and mixed into 100 parts of the same type of dimethylpolysiloxane used in the first mixture to yield a second mixture. These two mixtures were placed in separate liquid silicone rubber composition tanks, and the contents of these tanks were then cooled to −10° C. 250 Parts mixture A and 250 parts mixture B were both fed to a common homomixer which had previously been cooled to +5° C. in advance and were blended to homogeneity. To this mixture was added 1.000 parts ion-exchanged water cooled to 5° C., followed by mixing of the composition at a stirrer speed of 800 rpm to yield a dispersion of a heat-curable liquid silicone rubber composition of this invention. The resultant dispersion was then transferred to a stirrer-equipped container, 2,000 parts ion-exchanged water at a temperature of 85° C. were then immediately added and the resultant composition was cured by mixing it for 2 minutes using a stirrer speed of 800 rpm. The product was a cured silicone rubber powder with an average particle size of 30 microns. The volume resistivity of this silicone rubber powder was $10^{15}$ ohm-cm.

For comparative purposes a silicone rubber powder was produced exactly as described in the first part of this Example, with the exception that an aqueous mixture of 100 parts ion-exchanged water and 2 parts of a nonionic surfactant (an ethylene oxide adduct of trimethylnonanol, available as Tergitol TMN-6 from Union Carbide) cooled to 5° C. was used in place of the 1.000 parts ion-exchanged water at +5° C. The cured product was a powder with an average particle size of 12 microns. The volume resistivity of this powder varied from $10^{12}$ to $10^{13}$ ohm-cm, and was variable. This demonstrates the substantial reduction in resistivity resulting from the presence of a surfactant in the aqueous medium used to prepared the initial dispersion of a curable liquid silicone rubber composition.

That which is claimed is:

1. A method for preparing a finely divided cured silicone rubber powder exhibiting a volume resistivity greater than $10^{13}$ ohm-cm, said method comprising (1) forming a dispersion of a heat-curable liquid silicone rubber composition in water maintained at a temperature of from 0° to 25° C. and in the absence of surfactants, (2) dispersing the resultant dispersion into a liquid maintained at a temperature of at least 50° C. to obtain said cured silicone rubber in the form of said finely divided powder, and (3) isolating said powder from said liquid.

2. A method according to claim 1 where said composition cures by either (1) a platinum catalyzed addition reaction between an organopolysiloxane containing at least two lower alkenyl radicals per molecule and an organohydrogenpolysiloxane containing at least two silicon bonded hydrogen atoms per molecule, or (2) a free radical initiated polymerization of an organopolysiloxane containing at least two vinyl radicals per molecule in the presence of an organic peroxide.

3. A method according to claim 2 where said composition cures by said platinum catalyzed addition reaction, the sum of the number of silicon bonded hydrogen atoms and the number of silicon bonded lower alkenyl radicals present in said curable composition is at least 5, said organopolysiloxane is a dimethylvinylsiloxy terminated dimethylpolysiloxane and said organohydrogenpolysiloxane is a methylhydrogenpolysiloxane.

4. A method according to claim 1 where the curable liquid silicone rubber composition is maintained at a temperature of from −30° to 0° C. before being dispersed in said water and the temperature of said water is from 0° to +5°.

5. A method according to claim 1 where the liquid into which said dispersion is dispersed is water at a temperature of at least 80° C. and the volume of said liquid is at least twice the volume of said dispersion.

* * * * *